United States Patent [19]
Suzuki et al.

[11] Patent Number: 5,777,415
[45] Date of Patent: Jul. 7, 1998

[54] TWO-PHASE UNIPOLAR DRIVE TYPE BRUSHLESS DC MOTOR

[75] Inventors: Yuzuru Suzuki; Sakae Fujitani; Kenichi Makino, all of Asaba-cho, Japan

[73] Assignee: Minebea Co., Ltd., Nagano-ken, Japan

[21] Appl. No.: 810,300

[22] Filed: Mar. 3, 1997

[30] Foreign Application Priority Data

Apr. 8, 1996 [JP] Japan ................................ 8-110580

[51] Int. Cl.$^6$ ................................................ H02K 21/12
[52] U.S. Cl. ................................................ 310/156
[58] Field of Search ................................ 310/156, 268, 310/68 B, 103, 59

[56] References Cited

U.S. PATENT DOCUMENTS

| | | | |
|---|---|---|---|
| 3,299,335 | 1/1967 | Wessels | 310/156 |
| 4,859,887 | 8/1989 | Carlsson et al. | 310/59 |
| 5,254,895 | 10/1993 | Koizumi | 310/156 |
| 5,530,307 | 6/1996 | Horst | 310/156 |
| 5,581,140 | 12/1996 | Futami et al. | 310/156 |
| 5,596,238 | 1/1997 | Milnikel | 310/103 |
| 5,610,457 | 3/1997 | Kurita | 310/68 B |
| 5,637,945 | 6/1997 | Yamamuro et al. | 310/268 |
| 5,682,073 | 10/1997 | Mizuno | 310/165 |

FOREIGN PATENT DOCUMENTS

| | | |
|---|---|---|
| 0421346 A2 | 4/1991 | European Pat. Off. . |
| 0433479 A1 | 6/1991 | European Pat. Off. . |
| 2617344 | 12/1988 | France . |
| 2650712 | 2/1991 | France . |
| 1-318536 | 12/1989 | Japan . |

OTHER PUBLICATIONS

Patent Abstracts of Japan, vol. 007, No. 136 (E–181), 14 Jun., 1983 & JP 58–051764 A (Matsushita Denki Sangyo KK), 26 Mar., 1983—Abstract.

Patent Abstracts of Japan, vol. 007, No. 222 (E–201), 4 Oct., 1983 & JP 58–112450 (Kokusan Denki KK), 4 Jul., 1983—Abstract.

*Primary Examiner*—Steven L. Stephan
*Assistant Examiner*—Thanh Lam
*Attorney, Agent, or Firm*—Frishauf, Holtz, Goodman, Langer & Chick

[57] ABSTRACT

A two-phase unipolar drive type brushless DC motor has an armature including a stator yoke with salient poles around which coils are wound, and a rotor having a retainer with a rotor magnet which faces the armature at a predetermined small interval defined between the rotor magnet and the armature. The retainer is made of a polymeric material containing magnetic powder and formed integral with a rotor magnet. The rotor magnet is made of a highly efficient magnetic material or a rare earth magnetic material and consists of segment type permanent magnet pieces which are arranged circumferentially in the retainer. The motor is manufactured at a low cost and provides a stable magnetic wave form which can be used as a spindle motor in various kinds of memory apparatuses.

12 Claims, 3 Drawing Sheets

TWO-PHASE UNIPOLAR DRIVE TYPE BRUSHLESS DC MOTOR

BACKGROUND OF INVENTION

1. Field of the Invention

The present invention relates to a DC motor and more particularly to a two-phase unipolar drive type brushless DC motor used as the spindle motor of an external memory apparatus such as an FDD (floppy disc drive), an HDD (hard disc drive), a CD-ROM or the like.

2. Description of the Related Art

The rotational speed of an external memory apparatus such as an FDD, an HDD, a CD-ROM or the like must be controlled with high accuracy. For this reason, a three-phase brushless motor, which is rotated with higher accuracy than other conventional motors, has been used as the spindle motor for driving the external memory apparatus. However, a high cost of this brushless motor has not come to meet the recent requirement that the spindle motor be inexpensive.

On the other hand, a two-phase unipolar drive type brushless DC motor can be manufactured at low cost because of its simple circuit structure. However, since a conventional motor of this type uses a cylindrical magnet as a field permanent magnet, a clearance is produced between the magnet and a magnetizing jig, and thus variation of a magnetic wave form inevitably occurs. This results in production of large torque ripple, making it difficult to maintain the required constant starting torque. If a magnet made of rare earth material or the like with a high efficiency is used as the cylindrical magnet serving as a field permanent magnet, the starting torque can be maintained at the required value. However, the use of the highly efficient magnet elevates the cost of the motor. Further, the aforementioned cylindrical shape of the magnet lowers the stability of the magnetic wave form. Thus, the conventional two-phase unipolar drive type brushless DC motor cannot be used as the spindle motor.

SUMMARY OF THE INVENTION

The object of the present invention is to provide an inexpensive two-phase unipolar drive type brushless DC motor which can be used as a spindle motor in a various kinds of memory apparatuses.

In order to achieve the above object, a two-phase unipolar drive type brushless DC motor comprises an armature and a rotor, the armature including a stator yoke with salient poles and coils wound around the salient poles, and the rotor including a field permanent magnet which faces the armature with a predetermined small interval between the field permanent magnet and the armature. The rotor further includes a retainer which is coaxial with the armature and which is formed of a polymeric material containing magnetic powder. The field permanent magnet is made of a highly efficient magnetic material or a rare earth magnetic material and comprises segment type magnets which are arranged at intervals circumferentially of the retainer.

The two-phase unipolar drive type brushless DC motors disclosed in U.S. Pat. No. 3,299,335 and Published Unexamined Japanese Patent Application No. 1-318536 are provided on the armatures with interpoles, and the field magnet is provided with a non-magnetic portion or a groove, thus enabling a magnetic wave form to be changed from a sine wave form to a suitable non-sinusoidal wave form, in order to stabilize the starting of the motors at the portions other than dead centers of torque. As a result of research, the inventors of the present invention succeeded in developing a two-phase unipolar driving type brushless DC motor which generates a non-sinusoidal wave form achieving the same effect as that attained by the motors disclosed in the above-mentioned prior art documents, by forming the field permanent magnet into segment type magnets made of a rare earth magnetic material and arranging them circumferentially at intervals in the retainer.

Insertion windows in which the field segment type magnet pieces are inserted are formed in the retainer. Each window has a rectangular shape so that the magnet is set accurately not only in the predetermined circumferential position but also in a predetermined vertical direction with respect to the armature. Moreover, a gap between the armature and each of those faces of insertion windows which face the armature is made larger than an interval between the armature and each of the segment type magnets, thereby allowing the magnetic wave form and the gap to be controlled with ease.

Further, since an FG magnet (frequency generator magnet) for controlling the motor, an index magnet and an excitation switching magnet are arranged on an end face of the retainer, they are integrally formed with the retainer by using a plastic magnetic material as the material of the retainer, thus reducing the number of parts of the rotor.

In this arrangement, the field magnet is made from a minimum amount of material and is provided in a stable position in which the motor is driven the most efficiently. Further, the motor is manufactured at a low cost because the FG magnet, the index magnet and the excitation switching magnet are formed integral with the retainer.

Furthermore, positioning bosses are provided on the outer periphery of the retainer, and a plurality of cutaways for positioning the retainer are formed in the rotor yoke which is to be positioned so as to face the retainer. The index magnet can be accurately, stably and easily provided on the rotor yoke by engaging the positioning bosses with their corresponding cutaways.

In consequence, the present invention provides an inexpensive and highly accurate two-phase unipolar drive type brushless DC motor which can be used in various kinds of memory apparatuses.

DETAILED DESCRIPTION OF THE PREFERRED EMBODIMENT

Figure 1:
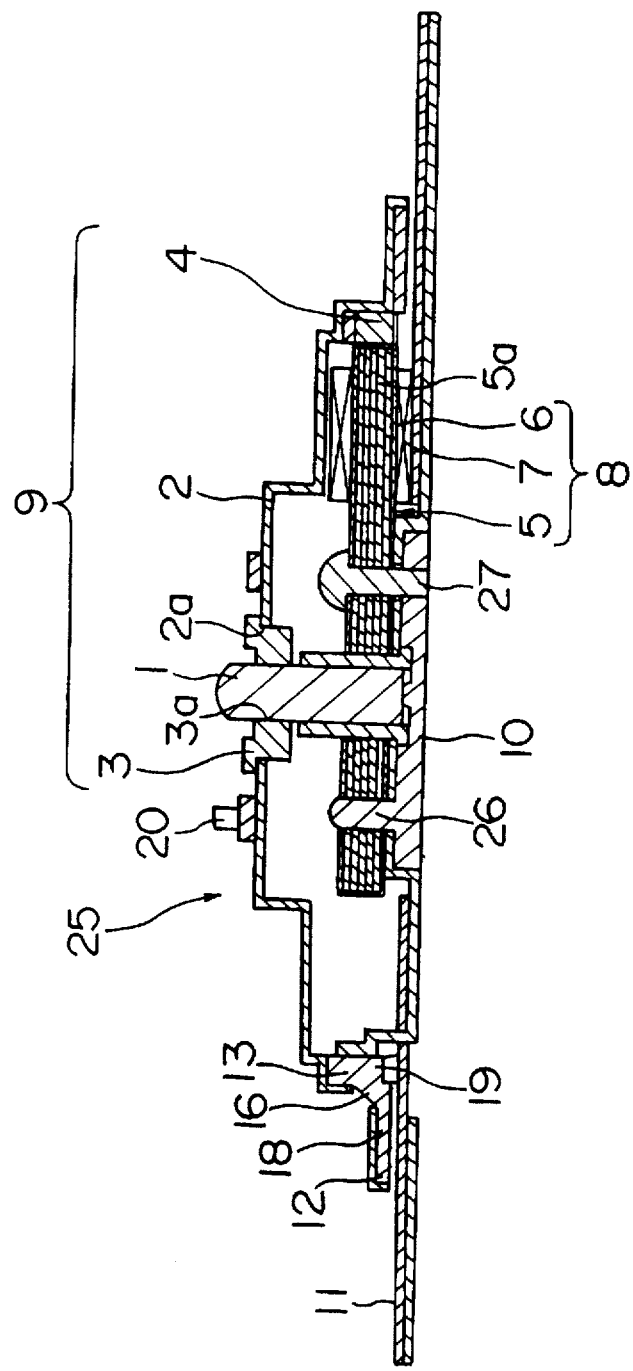
FIG. 1 is an axial longitudinal cross-sectional view of the present embodiment.

The present invention will be described with reference to the accompanying drawings by way of an embodiment of a two-phase unipolar drive type brushless DC (direct current) motor used as a spindle motor for driving an FDD (floppy disk drive). As shown in FIG. 1, a two-phase unipolar drive type brushless DC motor 25 (hereinafter simply referred to as the "spindle motor 25") has a rotary shaft 1 and a rotor yoke 2. The rotor yoke 2 is formed into a dish shape by pressing a soft iron plate made of a ferromagnetic material. In its center is formed a hole 2a in which a hub base 3 is securely fitted. In the hub 3 is formed a center hole 3a in which the rotary shaft 1 is press-fitted. When the spindle motor 25 is incorporated in an FDD (floppy disk drive), the hub of a floppy disk (not shown) mounted on the upper surface of the hub base 3 engages a driving pin 20 provided on the rotor yoke 2, thus enabling the floppy disk to rotate as the rotor yoke 2 rotates.

A rotor magnet 4 is bonded to the inner surface of an outer circumferential portion of the rotor yoke 2. An armature 8 faces the rotor magnet 4 with a gap therebetween. The armature 8 comprises a stator yoke 5, an insulating layer 6 formed on the stator yoke 5, salient poles 5a circumferentially arranged on the stator yoke 5 and extending outward from the stator yoke 5, and coils 7 formed by winding copper wires covered with polyurethane or the like material around the salient poles 5a. Provided on the center of the armature 8 is a bearing 10 which receives the rotary shaft 1 also serving as the center shaft of a rotor 9. The armature 8 and the bearing 10 are set in the predetermined positions by means of a pin 26 with respect to the substrate 11 of a motor driving device, and they are fixed to the substrate 11 by means of a set screw 27. The rotary shaft 1, the rotor yoke 2, the hub base 3 and the rotor magnet 4 are constituents of the rotor 9.

Figure 2:
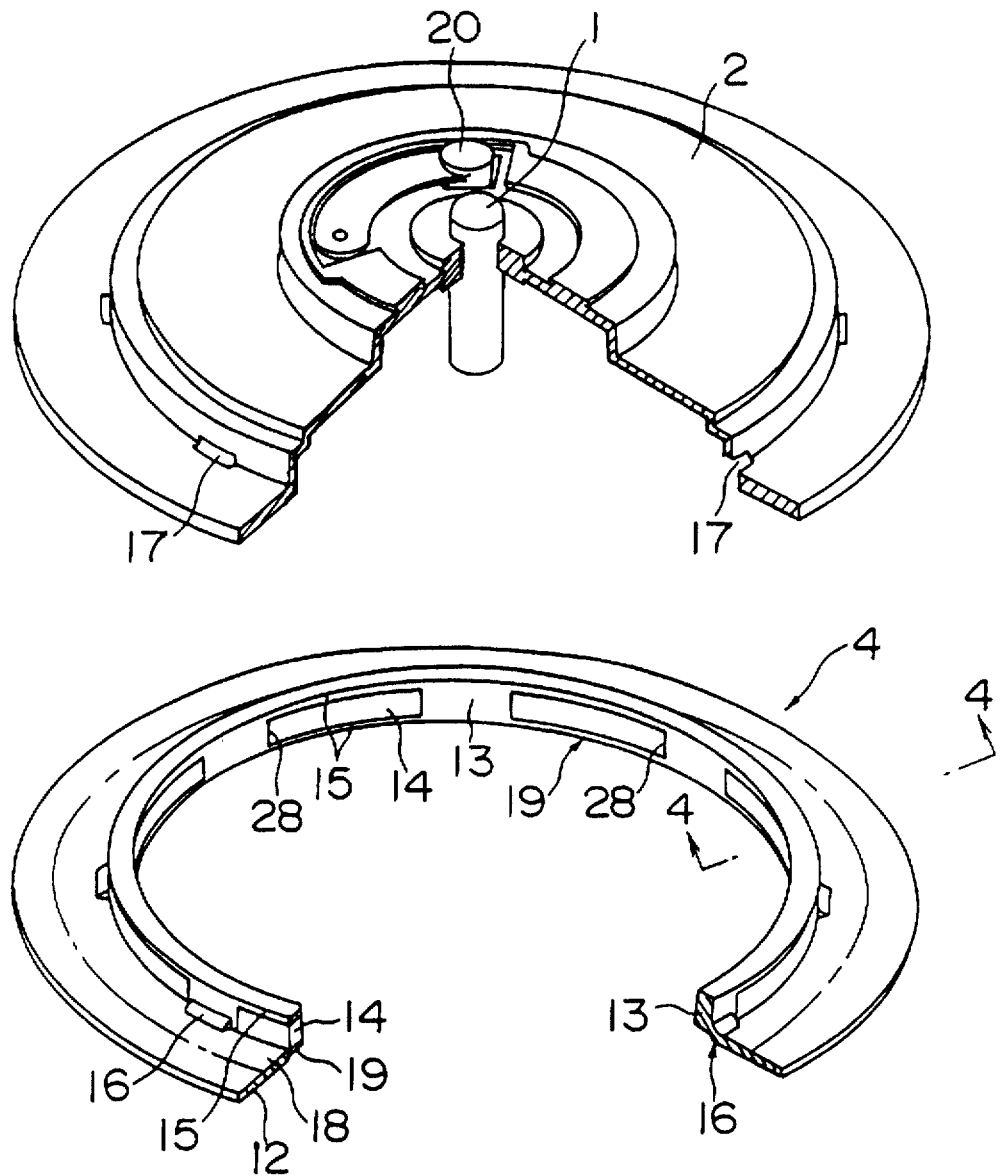
FIG. 2 is a partially broken enlarged exploded perspective view of the rotor magnet according to the motor of FIG. 1.

FIG. 2 is a partially broken enlarged exploded perspective view of the rotor magnet 4 according to the motor of FIG. 1. A retainer 13, which is made of a polymeric material (a plastic magnet material) containing magnetic powder or particles, has an FG magnet (frequency generator magnet), an index magnet 18 and an excitation switching magnet 19 which are formed integrally. The rotor magnet 4 comprises the retainer 13 and eight segment type magnet pieces 14 which constitute a field permanent magnet and are embedded in the retainer 4 so as to be arranged circumferentially thereof at intervals. As shown in FIG. 1, the rotor magnet 4 is bonded to the rotor yoke 2. The segment type magnet pieces 14 are made of a rare earth magnetic material. In this embodiment, the FG magnet 12 is formed outside the index magnet 18. However, the index magnet 18 can be formed outside the FG magnet.

When a rare earth magnet material is used as a material in the general conventional motor, it is difficult to perform magnetization because a rare earth material produces a strong coercive force which is one of its characteristics. Further, the motor has a plurality of poles to be magnetized, this makes it more difficult to perform magnetization of all poles. In the present invention, however, the rotor magnet 4 is provided with the retainer 13, and a plurality of divided magnet pieces 14 constituting the field permanent magnet 4 are arranged circumferentially at intervals in the retainer 13. This arrangement minimizes the amount of rare earth magnetic material to be used. In addition, the magnetization is performed in a divided manner, thereby remarkably improving the magnetization process and simplifying the structure of magnetization jigs in order to improve the durability of the jigs.

As shown in FIG. 2, the retainer 13 has pairs of upper and lower ribs 15, each pair of which define a square or rectangular insertion window 28. The segment type magnet pieces 14 are inserted in the respective insertion windows 28 and fixed thereto, and the upper and lower surfaces of the magnet pieces 14 are in contact with the upper and lower ribs 15 in such a manner that the center of the rotor magnet 4 measured vertically coincides with the center of the armature 8 measured vertically. In this way, the magnetic connection between the rotor magnet 4 and the armature 8 facing it is in the best condition.

Figure 3:
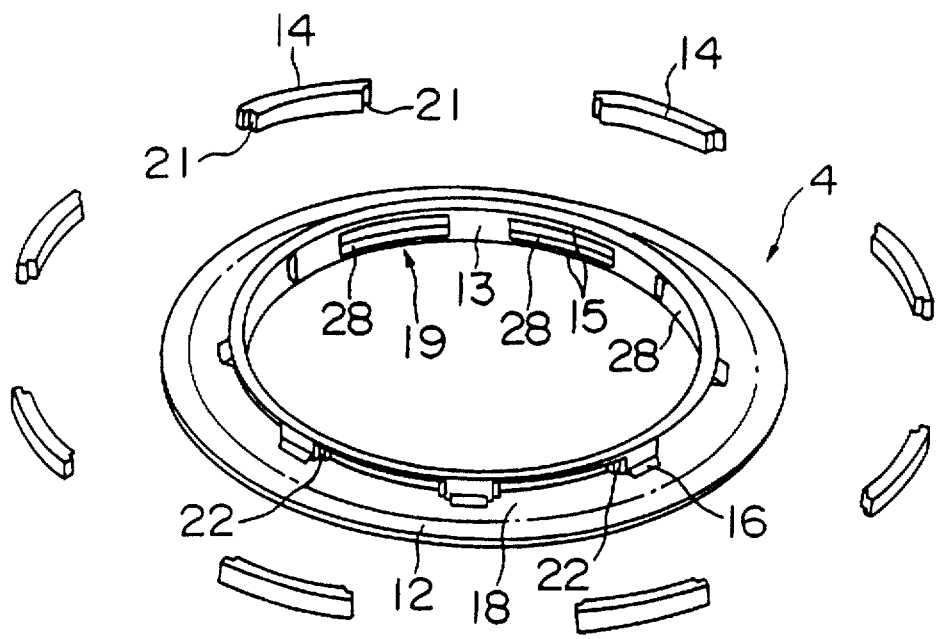
FIG. 3 is an enlarged exploded perspective view of the retainer according to the motor of FIG. 1.

As shown in FIG. 3 which is an exploded perspective view of the rotor magnet 4, stepped positioning bosses 21 are formed on each segment type magnet piece 14. Further, stepped positioning bosses 22 which are shaped entirely complementary to the stepped positioning bosses 21 are formed on each insertion window 28 of the retainer 13 so that the segment type magnet pieces 14 can be positioned radially accurately and thus the magnetization wave form can be stabilized with a high accuracy. The positioning bosses are not limited to the stepped ones of this embodiment, and may be formed into a tapered shape or another shape as long as they fit well mutually.

In this way, the positioning accuracy and magnetizing accuracy of the segment type magnet pieces 14 are enhanced, with the result that the magnetic wave form is stabilized. This makes the characteristics of the motor stable.

As shown in FIG. 2, bosses 16 which are triangular in cross section, for example, are provided on those outer peripheral portions of the retainer 13 which are between adjacent segment type magnet pieces 14. Moreover, a plurality of cutaways 17 are formed on the portions of the rotor yoke 2 which correspond to the portions of the rotor yoke 2 between the outer periphery of the retainer 13 and the FG magnet 12 when the rotor yoke 2 and the rotor magnet 4 are assembled together. The cutaways 17 are spaced circumferentially of the rotor yoke 2. When the bosses 16 of the retainer 13 are fitted in the corresponding cutaways 17 of the rotor yoke 2, the index magnet 18 is set in the required position with respect to the driving pin 20.

Since, therefore, the rotor yoke 2 and the retainer 13 are provided separately from each other, various kinds of magnetization for the FG, index and excitation switching magnets can be provided in the retainer 13 before the retainer 13 is inserted in the rotor yoke 2, thereby improving the efficiency of the magnetization.

Since the bosses 16 provided on the retainer 13 are not magnetized, magnetic leakage from the rotor 9 is prevented, and there can be reduced an adverse effect which is produced from leakage fluxes acting on the rotor 9 and the reduction of which is particularly important to magnetic memory apparatus.

Since the index magnet 18, the FG magnet 12 and the excitation switching detecting magnet 19 which constitute the rotor magnet 4 are all made of the same polymeric material, the rotor magnet 4 is insert-molded together with the segment type magnet pieces 14. This integral rotor magnet 4 can be handled easily and can be operated efficiently. Further, the efficiency of the assembly of the rotor magnet can be improved.

Figure 4:
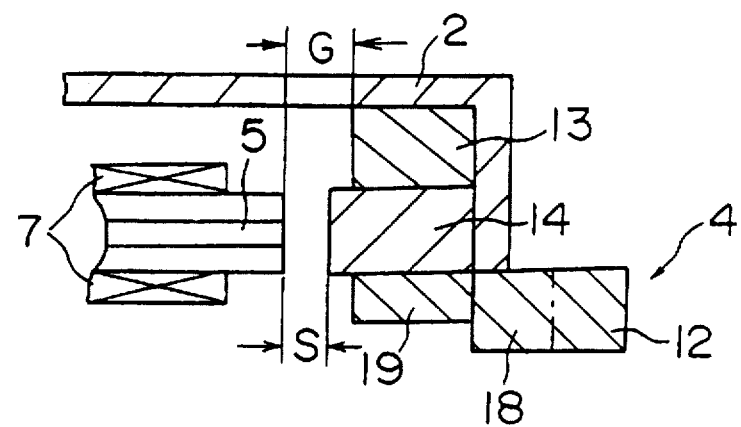
FIG. 4 is a cross-sectional view taken along line A–A' shown in FIG. 2.

FIG. 4 shows the relationship of the radial arrangement between the segment type magnet pieces 14, the retainer 13 and the stator yoke 5. A gap G between the stator yoke 5 and the retainer 13 is about 0.1 mm to 0.5 mm wider than an interval S between the stator yoke 5 and the segment type magnet pieces 14. This arrangement can make the tolerance of the diameter of the retainer 13 large. This means that the tolerances of the dimensions of the parts of the retainer 13 can be made large.

The embodiment in which a motor according to the present invention is applied to an FDD has been described. However, the motor of the present invention can be used as the spindle motor of another external memory apparatus such as an HDD, a CD-ROM or the like. Moreover, the material of the segment type magnet pieces is not limited to the rare earth magnetic material but may be another magnetic material having a high performance efficiency.

The present invention provides an inexpensive two-phase unipolar drive type brushless DC motor suitable for use as the spindle motor of an external memory apparatus, since the use of segment type magnet pieces can minimize the amount of an expensive rare earth magnetic material to be used and can reduce the number of parts of the rotor. Further, the segment type magnet pieces can be positioned at a high accuracy and a stable magnetizing wave form can be obtained, whereby the motor characteristics can be stabilized.

What is claimed is:

1. A two-phase unipolar drive type brushless DC motor including:
   (1) an armature comprising a stator yoke, salient poles extending radially outward from said stator yoke, and coils wound around said salient poles;
   (2) a rotor having a rotor yoke, said rotor being arranged coaxially with respect to said armature with a predetermined small gap defined between said rotor and said armature;
   (3) an annular shaped retainer provided on said rotor, said retainer being disposed coaxially with respect to said armature, and said retainer being made of a polymeric material containing magnetic powder;
   (4) insertion windows formed in said retainer at circumferential intervals; and
   (5) segment type magnet pieces made of a rare earth magnetic material, said segment type magnet pieces being arranged in said insertion windows at predetermined vertical and circumferential positions along said retainer.

2. The motor according to claim 1, further comprising a gap provided between said stator yoke and said retainer and an interval provided between said stator yoke and said segment type magnet pieces, wherein said gap between said stator yoke and said retainer is made wider than said interval between said stator yoke and said segment type magnet pieces.

3. The motor according to claim 1, wherein said retainer is insert-molded together with said segment type magnet pieces.

4. The motor according to claim 3, wherein said retainer is insert-molded together with said rotor yoke.

5. The motor according to claim 1, wherein said retainer comprises a frequency generator magnet.

6. The motor according to claim 1, wherein said retainer further comprises an index magnet.

7. The motor according to claim 6, wherein said retainer further comprises an excitation switching magnet.

8. The motor according to claim 1, wherein said retainer comprises an index magnet.

9. The motor according to claim 8, wherein said retainer further comprises an excitation switching magnet.

10. The motor according to claim 1, wherein said retainer comprises an excitation switching magnet.

11. The motor according to claim 1, wherein said retainer has positioning bosses for positioning said retainer to said rotor yoke, and said rotor yoke has a plurality of cutaways which engage said positioning bosses.

12. The motor structure according to claim 11, wherein said positioning bosses are not magnetized.

* * * * *